US010875228B2

(12) United States Patent
Clarke

(10) Patent No.: US 10,875,228 B2
(45) Date of Patent: Dec. 29, 2020

(54) INJECTION MOULDING METHOD

(71) Applicant: Gr8 Engineering Limited, Chichester, West Sussex (GB)

(72) Inventor: Peter Reginald Clarke, Petworth (GB)

(73) Assignee: GR8 Engineering Limited, West Sussex (GB)

( * ) Notice: Subject to any disclaimer, the term of this patent is extended or adjusted under 35 U.S.C. 154(b) by 259 days.

(21) Appl. No.: 15/761,466

(22) PCT Filed: Sep. 22, 2016

(86) PCT No.: PCT/EP2016/072521
§ 371 (c)(1),
(2) Date: Mar. 20, 2018

(87) PCT Pub. No.: WO2017/050881
PCT Pub. Date: Mar. 30, 2017

(65) Prior Publication Data
US 2018/0264699 A1 Sep. 20, 2018

(30) Foreign Application Priority Data
Sep. 25, 2015 (GB) .................................. 1517010.3

(51) Int. Cl.
*B29C 51/02* (2006.01)
*B29C 45/56* (2006.01)
(Continued)

(52) U.S. Cl.
CPC ............ *B29C 45/561* (2013.01); *B29C 45/56* (2013.01); *B29C 51/02* (2013.01);
(Continued)

(58) Field of Classification Search
CPC .......... B29C 45/561; B29C 2045/2693; B29C 2045/5625; B29C 2045/569; B29C 2045/5665
See application file for complete search history.

(56) References Cited

U.S. PATENT DOCUMENTS 3,602,946 A * 9/1971 Curetti .................... B29C 45/00
425/185
5,681,356 A 10/1997 Barak et al.
(Continued)

FOREIGN PATENT DOCUMENTS

DE 19745909 A1 4/1999
EP 2653286 A2 10/2013
(Continued)

OTHER PUBLICATIONS

Translation of Kawashima JPS63179722 (Year: 1988).*
(Continued)

*Primary Examiner* — Jacob T Minskey
*Assistant Examiner* — Adrien J Bernard
(74) *Attorney, Agent, or Firm* — Polsinelli, PC

(57) ABSTRACT

A method of injection moulding an article, the method comprising the steps of: (a) providing an injection mould comprising a plurality of mould parts defining a mould cavity of the injection mould, the plurality of mould parts including first and second movable mould parts, the injection mould further comprising an injection inlet for injecting molten thermoplastic resin material into the mould cavity, wherein the injection inlet is located in the vicinity of the first movable mould part and the second movable mould part is remote from the injection inlet; (b) disposing the first and second movable mould parts in a first configuration so as to define a first intermediate moulding cavity, in which first configuration the first movable mould part is in a first rearward position and the second movable mould part is in
(Continued)

a first forward position; (c) injecting molten thermoplastic resin material into the first intermediate moulding cavity through the injection inlet to fill the first intermediate moulding cavity with the molten material; (d) closing the injection inlet; (e) after commencement of the injecting step and at least partly after the closing step, moving the second movable mould part from the first forward position to a second rearward position; (f) moving the first movable mould part from the first rearward position to a second forward position; and (g) moving the second movable mould part from the second rearward position to a third forward position thereby to dispose the first and second movable mould parts in a final configuration so as to define a final moulding cavity of the injection mould filled with the molten material, the final moulding cavity defining a cavity outer surface which defines the outer shape of the article to be moulded.

31 Claims, 6 Drawing Sheets

(51) Int. Cl.
   *B29L 31/00* (2006.01)
   *B29K 105/00* (2006.01)
   *B29C 45/26* (2006.01)
   *B29K 67/00* (2006.01)

(52) U.S. Cl.
   CPC .......................... *B29C 2045/2693* (2013.01); *B29C 2045/564* (2013.01); *B29C 2045/569* (2013.01); *B29C 2045/5625* (2013.01); *B29K 2067/003* (2013.01); *B29K 2105/256* (2013.01); *B29L 2031/712* (2013.01)

(56) References Cited

U.S. PATENT DOCUMENTS

| | | | |
|---|---|---|---|
| 2006/0033228 A1* | 2/2006 | Hoogland | B29C 43/36 264/68 |
| 2013/0224508 A1* | 8/2013 | Todesco | B29C 45/561 428/523 |
| 2013/0337253 A1* | 12/2013 | Yamaguchi | B29C 45/0005 428/220 |
| 2017/0001346 A1* | 1/2017 | Hanson, III | B29C 45/0055 |

FOREIGN PATENT DOCUMENTS

| | | | | |
|---|---|---|---|---|
| JP | S63179721 A | | 7/1988 | |
| JP | S63179722 B2 | | 7/1988 | |
| JP | H06218762 | * | 8/1994 | ......... B29C 45/5675 |
| JP | H09123237 A | | 5/1997 | |
| JP | H10230534 A | | 9/1998 | |
| JP | 2870341 B2 | | 3/1999 | |
| JP | 2014237226 B2 | | 12/2014 | |

OTHER PUBLICATIONS

Translation of Wada JPH06218762 (Year: 1994).*
Translation of Tanaka JPH09123237 (Year: 1997).*
Translation of Herbst DE19745909 (Year: 1999).*
Translation of Yoshimura JP2014237226 (Year: 2014).*
Office Action in corresponding Chinese Application No. 201680063130.7 dated Aug. 30, 2019 with English translation.
International Preliminary Report on Patentability which dated Mar. 27, 2018 in corresponding International Patent Application No. PCT/EP2016/072521.
Search and Examination Report under Sections 17 and 18(3) dated Sep. 24, 2017 in GB1517010.3.
Int'l. Search Report and Written Opinion dated Dec. 7, 2016 in PCT/EP2016/072521.

* cited by examiner

INJECTION MOULDING METHOD

FIELD OF THE INVENTION

The present invention relates to a method of injection moulding an article. In particular, the present invention relates to the injection moulding of preforms for containers from thermoplastic resin material.

BACKGROUND

Injection moulding of articles from plastics materials, in particular thermoplastic polymers, is well known in the art. In particular, the injection moulding of containers, and preforms for containers, from plastics material is conventional in the art.

It is often desired to injection mould plastics containers having a small wall thickness, for example to reduce material costs. When it is necessary to injection mould an article, such as a container preform, having a high L/T ratio (where L is the flow length of the molten plastics material from the injection gate and T is the wall thickness), a high injection pressure at the gate is needed to ensure that the mould cavity is filled with the molten plastics material. The gate acts to restrict material flow therethrough, and the wall section directly opposite the gate also restricts the material flow into the cavity. However, for wall thicknesses of less than 1 mm and L/T ratios of greater than 50, even if a high injection pressure at the gate is used the periphery of the mould cavity most remote from the gate may not be fully filled with the molten plastics material. It has been proposed to flow the molten material into the cavity at a faster rate to try to fill the cavity, which may require to increase the fill pressure. The higher fill pressure will, in turn, require a higher mould clamp pressure to counter the hydraulic force on the walls defining the mould cavity. It should be readily apparent to the skilled reader why injection moulding machines for the manufacture of plastics packaging need to have very high injection speeds and pressures, and very rigid platens, with consequential complexity and expense, to make what appears to be a simple article or preform.

There is a need in the art for a cost effective, robust injection moulding process that at least partly overcomes the various problems with known processes as discussed above.

In particular, there is a need for an injection moulding process, that is suitable for producing injection moulded articles, such as containers, preforms for containers, lids, tubs, closures, etc. having high flow-length: wall thickness ratios, and/or low material stress, which can be produced using conventional injection moulding machines and therefore can be interfaced with the minimum of problems into conventional production practices.

The present invention aims at least partly to meet these needs in the art of injection moulded article, in particular container preform, manufacture.

SUMMARY OF THE INVENTION

The present invention accordingly provides a method of injection moulding an article, the method comprising the steps of:
(a) providing an injection mould comprising a plurality of mould parts defining a mould cavity of the injection mould, the plurality of mould parts including first and second movable mould parts, the injection mould further comprising an injection inlet for injecting molten thermoplastic resin material into the mould cavity, wherein the injection inlet is located in the vicinity of the first movable mould part and the second movable mould part is remote from the injection inlet;
(b) disposing the first and second movable mould parts in a first configuration so as to define a first intermediate moulding cavity, in which first configuration the first movable mould part is in a first rearward position and the second movable mould part is in a first forward position;
(c) injecting molten thermoplastic resin material into the first intermediate moulding cavity through the injection inlet to fill the first intermediate moulding cavity with the molten material;
(d) closing the injection inlet;
(e) after commencement of the injecting step and at least partly after the closing step, moving the second movable mould part from the first forward position to a second rearward position;
(f) moving the first movable mould part from the first rearward position to a second forward position; and
(g) moving the second movable mould part from the second rearward position to a third forward position thereby to dispose the first and second movable mould parts in a final configuration so as to define a final moulding cavity of the injection mould filled with the molten material, the final moulding cavity defining a cavity outer surface which defines the outer shape of the article to be moulded.

Optionally, step (e) of moving the second movable mould part is commenced after closing the injection inlet in step (d).

Optionally, in steps (e) and (f) the first movable mould part and the second movable mould part are moved at least partly simultaneously, further optionally simultaneously.

Optionally, step (e) to move the second movable mould part is commenced, and further optionally completed, before step (f) to move the first movable mould part.

Optionally, step (f) to move the first movable mould part is carried out at least partly simultaneously, further optionally simultaneously, with step (g) to move the second movable mould part.

Optionally, in step (g) the first movable mould part is stationary.

Optionally, after step (e), and further optionally after steps (e) and (f), the first and second movable mould parts and the at least one further mould part are disposed in a second configuration so as to define a second intermediate moulding cavity at least partly filled with the moulding material.

Optionally, the second intermediate moulding cavity has a larger moulding volume than the first intermediate moulding cavity.

The present invention further provides a method of injection moulding an article, the method comprising the steps of:
(a) providing an injection mould comprising a plurality of movable mould parts and at least one stationary mould part defining a mould cavity of the injection mould, the injection mould further comprising an injection inlet for injecting molten thermoplastic resin material into the mould cavity;
(b) disposing the mould parts in a first configuration so as to define a first intermediate moulding cavity;
(c) injecting molten thermoplastic resin material into the first intermediate moulding cavity through the injection inlet to fill the first intermediate moulding cavity with the molten material to form a first intermediate article comprising molten material;

(d) closing the injection inlet;

(e) after the closing step, moving at least one of the movable mould parts to dispose the mould parts in a second configuration so as to define a second intermediate moulding cavity at least partly filled with the molten material to form a second intermediate article comprising molten material; and (f) moving the at least one of the movable mould parts to dispose the mould parts in a third configuration so as to define a final moulding cavity of the injection mould filled with the molten material, the final moulding cavity defining a cavity outer surface which defines the outer shape of the final article to be moulded; wherein the first intermediate article has a first L/T ratio, the second intermediate article has a second L/T ratio and the final article has a third L/T ratio, wherein each L/T ratio is a ratio, averaged along a maximum length of the respective article, of the maximum length of the article and a thickness of the article along that maximum length, and wherein the first L/T ratio is lower than the second L/T ratio and the second L/T ratio is lower than the third L/T ratio.

The present invention further provides a method of injection moulding an article, the method comprising the steps of:

(a) providing an injection mould comprising a plurality of mould parts defining a mould cavity of the injection mould, the plurality of mould parts including first and second movable mould parts, the injection mould further comprising an injection inlet for injecting molten thermoplastic resin material into the mould cavity, wherein the injection inlet is located in the vicinity of the first movable mould part and the second movable mould part is remote from the injection inlet;

(b) disposing the first and second movable mould parts in a first configuration so as to define a first intermediate moulding cavity, in which first configuration the first movable mould part is in a first rearward position and the second movable mould part is in a first forward position;

(c) injecting a volume of molten thermoplastic resin material into the first intermediate moulding cavity through the injection inlet to fill the first intermediate moulding cavity with the molten material;

(d) closing the injection inlet;

(e) after the closing step, moving the first and second movable mould parts thereby to dispose the first and second movable mould parts in a final configuration so as to define a final moulding cavity of the injection mould filled with the molten material, the final moulding cavity defining a cavity outer surface which defines the outer shape of the article to be moulded and the final moulding cavity have substantially the same volume as the first intermediate moulding cavity.

Optionally, in the final configuration the first mould part is forward of the first rearward position and the second mould part is rearward of the first forward position.

Optionally, step (e) comprises sub-step (i) moving the second movable mould part from the first forward position to a second rearward position and thereafter sub-step (ii) moving the second movable mould part from the second rearward position to a third forward position thereby to dispose the second movable mould part in the final configuration.

Optionally, step (e) comprises sub-step (iii) moving the first movable mould part from the first rearward position to a second forward position thereby to dispose the first movable mould part in the final configuration, wherein sub-step (iii) is carried out at least partly simultaneously with sub-step (i), or is carried out after sub-step (i), or is carried out at least partly simultaneously with sub-step (ii).

Optionally, sub-step (i) of moving the second movable mould part is commenced, and further optionally completed, before sub-step (iii) of moving the first movable mould part.

Optionally, sub-step (iii) of moving the first movable mould part is carried out at least partly simultaneously, further optionally simultaneously, with sub-step (ii) of moving the second movable mould part.

Optionally, in either or both of sub-steps (i) and (ii) the first movable mould part is stationary.

Optionally, after sub-step (i) and further optionally after sub-steps (i) and (iii), the first and second movable mould parts and the at least one further mould part are disposed in a second configuration so as to define a second intermediate moulding cavity at least partly filled with the moulding material.

Optionally, the second intermediate moulding cavity has a larger moulding volume than the first intermediate moulding cavity.

Preferred features are defined in the dependent claims.

Accordingly, the preferred embodiments of the present invention provides a method which can actively changes the L/T ratio of a moulded article during injection from a relatively low average L/T ratio in a first intermediate moulding cavity to a relatively high average L/T ratio in a subsequent second intermediate moulding cavity, and a yet relatively higher average L/T ratio in a subsequent final moulding cavity. This is achieved by allowing first and second movable mould parts to move forwardly and/or rearwardly after during injection to effectively reduce the L/T ratio in a step-wise manner by defining three successive cavity configurations of progressively reducing L/T ratio.

This invention in one particular embodiment employs a mould in an injection moulding machine in which the filling pressure of the injected material to be moulded is controlled by moving a part of the mould away from the injection gate, or vice versa. In either case, this movement of a mould part can increase the width of the portion of the mould cavity opposite the gate and so provide a low average L/T ratio during injection, and thereby reduce the filling pressure of the injected material. Thereafter the average L/T ratio is progressively increased in a step-wise manner to produce the final moulded article.

The method can be used for injection moulding a variety of articles, typically having a large substantially flat structure, and in particular preferably composed of PET, such as preforms for containers, trays, closures, lids, tubs, etc, which can be circular but optionally having a non-circular or non-rounded, e.g. rectangular, configuration in plan. The lids may be thin lids that are moulded with a shape and configuration to fit any desired container.

BRIEF DESCRIPTION OF THE DRAWINGS

Embodiments of the present invention will now be described by way of example only with reference to the accompanying drawings, in which.

DETAILED DESCRIPTION

Figure 1:
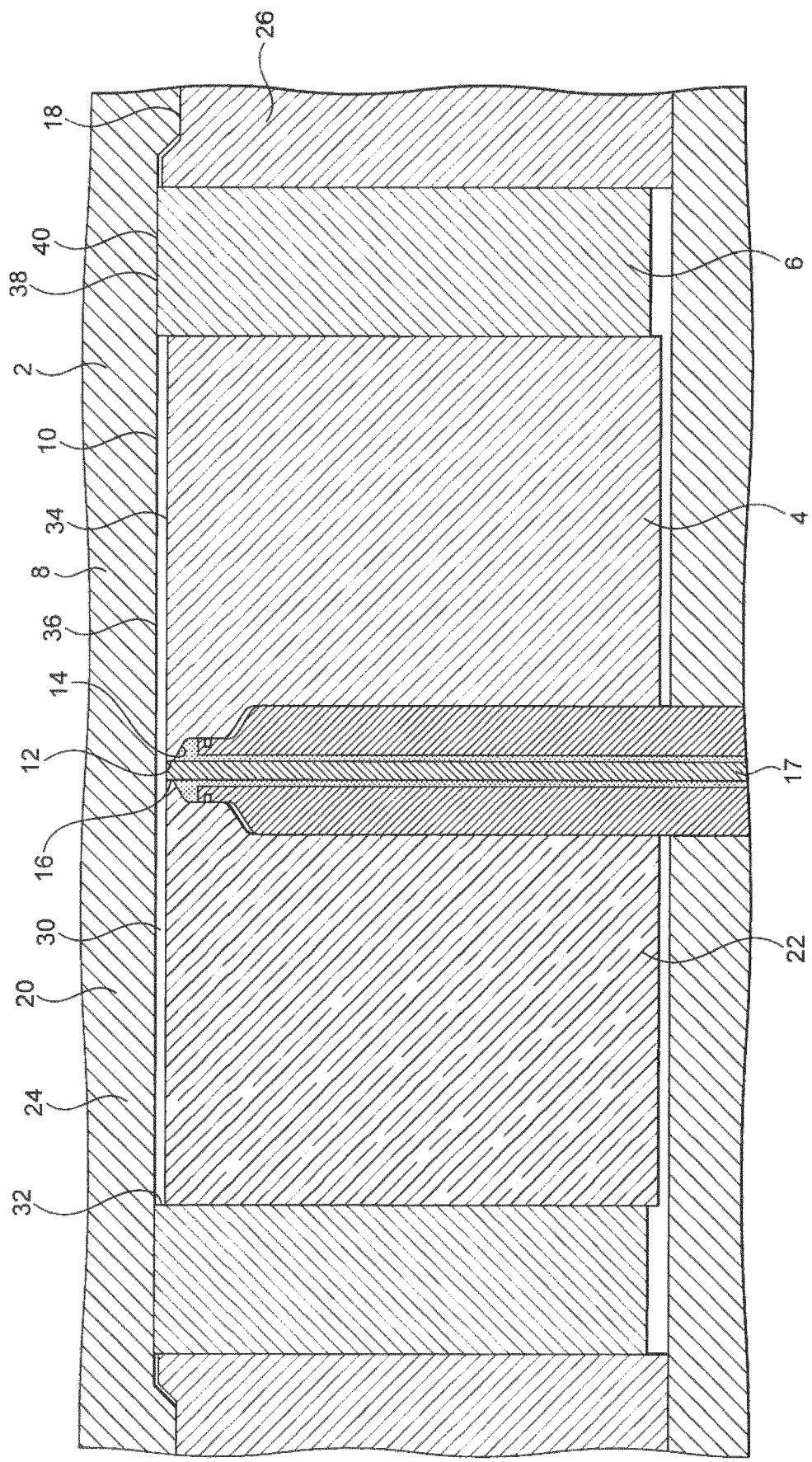
FIG. 1 is a schematic cross-section through an injection mould having movable parts for use in a method of injection moulding a preform in accordance with a first embodiment of the present invention.

Referring to FIGS. 1 to 5, there is shown an injection mould 2 for use in a method in accordance with a first embodiment of the present invention for injection moulding a preform 100 for subsequent moulding to form a container. The preform 100 is substantially planar. The preform 100 is moulded from a thermoplastic resin material. Typically, the thermoplastic resin material comprises polyester, for example at least one polyalkylene polyester or a blend of polyalkylene polyesters. Preferably, the polyester comprises at least one polyester selected from polyethylene terephthalate, polybutylene terephthalate, polyethylene naphthalate and polybutylene naphthalate. Most preferably the polyester comprises polyethylene terephthalate (PET).

Although the embodiment shows a substantially planar preform 100, the invention can be used to mould other preform shapes, as stated above, and using other thermoplastic resins.

The injection mould 2 comprises first and second movable mould parts 4, 6 and at least one further mould part 8. These mould parts 4, 6, 8 define a mould cavity 10 of the injection mould 2.

The injection mould 2 further comprises an injection inlet 12 for injecting molten thermoplastic resin material into the mould cavity 10. The injection inlet 12 is located in the vicinity of the first movable mould part 4 and the second movable mould part 6 is remote from the injection inlet 12. The injection inlet 12 comprises a feed nozzle 14 and a gate 16 of the feed nozzle 14, the gate 16 being controllable in known manner selectively to open and close the injection inlet 12 by movement of a valve pin 17. The injection inlet 12 may be located in or opposite to the first movable mould part 4. In the illustrated embodiment, the injection inlet 12 is located in the first movable mould part 4. The injection inlet 12 preferably has a dynamic seal to allow the first mould part 4 to slide in a back and forth manner along the injection inlet 12, and the valve pin 17 at the 16 gate also moves with the reciprocating stroke.

The first and second movable mould parts 4, 6 are on a common side of the injection mould 2. The at least one further mould part 8 is on an opposite side of the injection mould 2 from the first and second movable mould parts 4, 6. In the illustrated embodiment, a mould separation line 18 is provided between two mould halves 20, 22. A first mould half 20 comprises a first further mould part 24, which is stationary during the moulding process, and a second mould half 22 comprises the first and second movable mould parts 4, 6 and a second further mould part 26, which is stationary during the moulding process.

The first and second movable mould parts 4, 6 are mutually adjacent. The second movable mould part 6 at least partly surrounds the first movable mould part 4, and in the illustrated embodiment the second movable mould part 6 is annular and wholly surrounds the first movable mould part 4. The second movable mould part 6 moulds at least a part, or all, of an outer peripheral portion 102 of the preform 100. The second further mould part 26 moulds at least a part, or all, of a peripheral edge 104 of the preform 100.

The mould 2 is closed prior to the moulding method cycle by urging together two mould halves 20, 22 under a desired applied load.

In the moulding method, referring in particular to FIG. 1 initially the first and second movable mould parts 4, 6 and the further mould parts 24, 26 are disposed in a first configuration so as to define a first intermediate moulding cavity 30. In the first configuration the first movable mould part 4 is in a first rearward position and the second movable mould part 6 is in a first forward position.

The first intermediate moulding cavity 30 has substantially the same volume as the final moulding cavity. The area and stroke of the first mould part 4 create a volume of the first intermediate moulding cavity 30 which is substantially equal to the volume of the whole article to be moulded. Accordingly, the first intermediate moulding cavity 30 has a preselected volume so that a predetermined dose is injected, the predetermined dose being determined by the volume of the first intermediate moulding cavity 30 which in turn is set by the spacing of the back position of the first mould part 4. Such a predetermined dose therefore can eliminate the need to use shooting pots or other upstream predosing of the volume of polymeric resin material to be injected and compression moulded.

The back position of the first mould part 4 is preferably adjustable, typically by a distance of +/−100 to 200 microns. Accordingly, the predetermined dose is adjustable by adjusting the back stroke limit of the first movable mould part 4.

The back position of the second mould part 6 is also preferably adjustable, typically by a distance of +/−100 to 200 microns. The adjustable dimension can be employed to mould preforms with different thicknesses, for example with a thickness +/−100 to 200 microns thicker or thinner than a nominal design thickness of the preform. The adjustable thickness can be employed to optimize the weight of the container.

The first intermediate moulding cavity 30 is defined substantially between the first movable mould part 4 and the first further mould part 24 opposite thereto. A peripheral edge of the first intermediate moulding cavity 30 is defined by a side surface 32, which is a non-moulding surface, of the second movable mould part 6. A moulding surface 34 of the first movable mould part 4 is located spaced from an opposite moulding surface 36 of the first further mould part 24. A moulding surface 38 of the second movable mould part 6 is located adjacent to an opposite moulding surface 40 of the first further mould part 24, and so no portion of the first intermediate moulding cavity 30 is defined between the second movable mould part 6 and the first further mould part 24. The first intermediate moulding cavity 30 has a minimum width of at least 1 mm. Most preferably, the first intermediate moulding cavity 30 has a width at any location thereof within the range of from 0.5 to 10 mm, further optionally from 1 to 5 mm, still further optionally from 0.7 to 1.2 mm.

Figure 2:
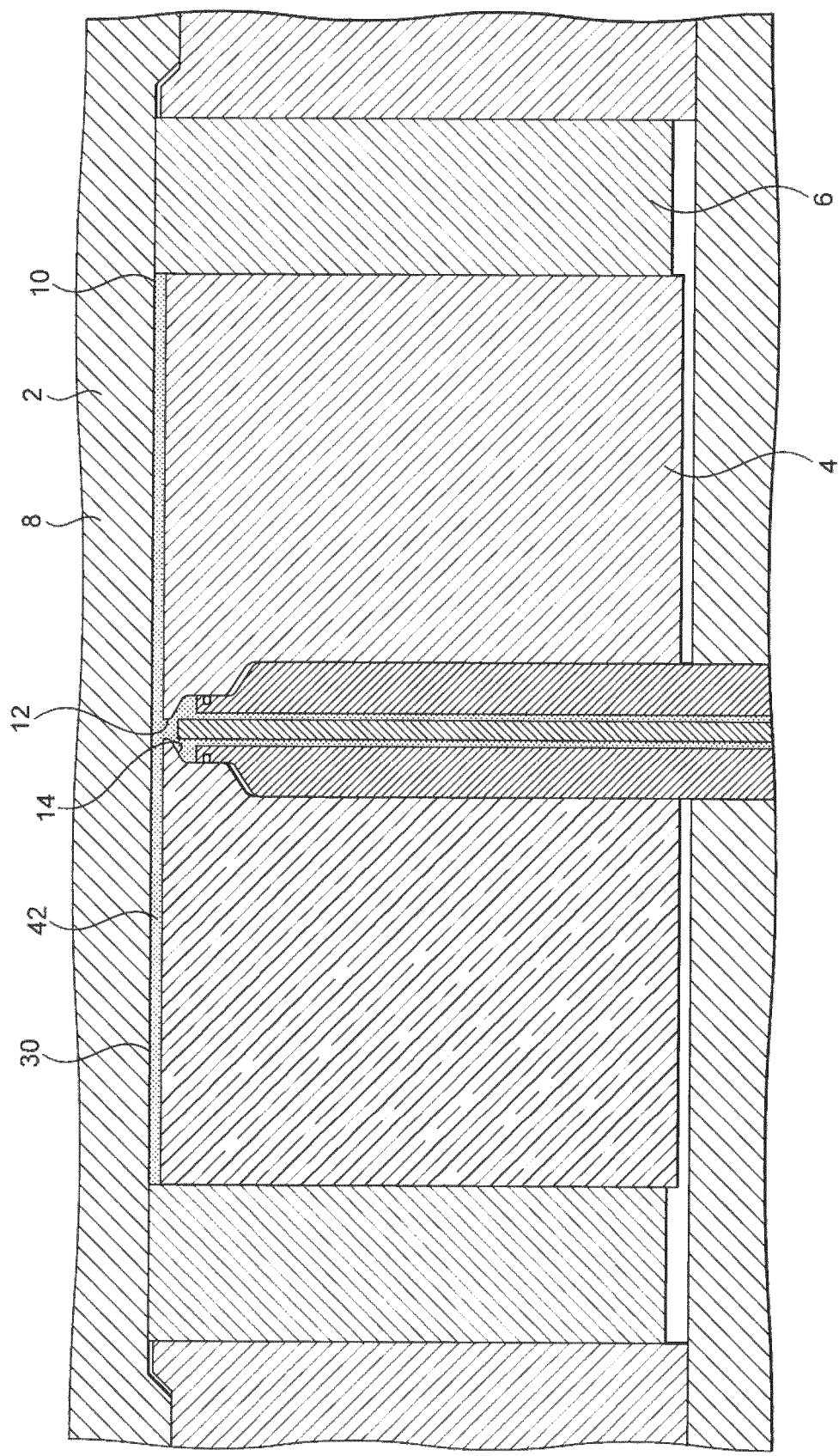
FIG. 2 is a schematic cross-section through the injection mould of FIG. 1 showing injection of a molten material into a first intermediate moulding cavity formed by a first arrangement of the movable mould parts in a first phase of the method.

Then, referring in particular to FIG. 2, molten thermoplastic resin material 42 is injected into the first intermediate moulding cavity 30 through the injection inlet 12 to fill the first intermediate moulding cavity 30 with the molten material 42. Typically, the molten material 42 is injected at an injection pressure of from 3,000 kPa to 60,000 kPa.

Preferably, a predosed amount of the molten material 42 is injected into the first intermediate moulding cavity 30, and the predosed amount is typically within +/−1 wt % of a target weight of the molten material 42 to be injected into the first intermediate moulding cavity 30. The target weight corresponds to a weight of the preform 100. The weight of the thermoplastic resin material 42 injected into the first intermediate moulding cavity 30 is the same as the weight of the preform 100. The use of such a predosed amount can avoid the need for any upstream predosing, since the volume of the first intermediate moulding cavity 30 in front of the first mould part 4 substantially defines the desired volume of material to be injected and so would correspond to the volume of any predose.

Figure 3:
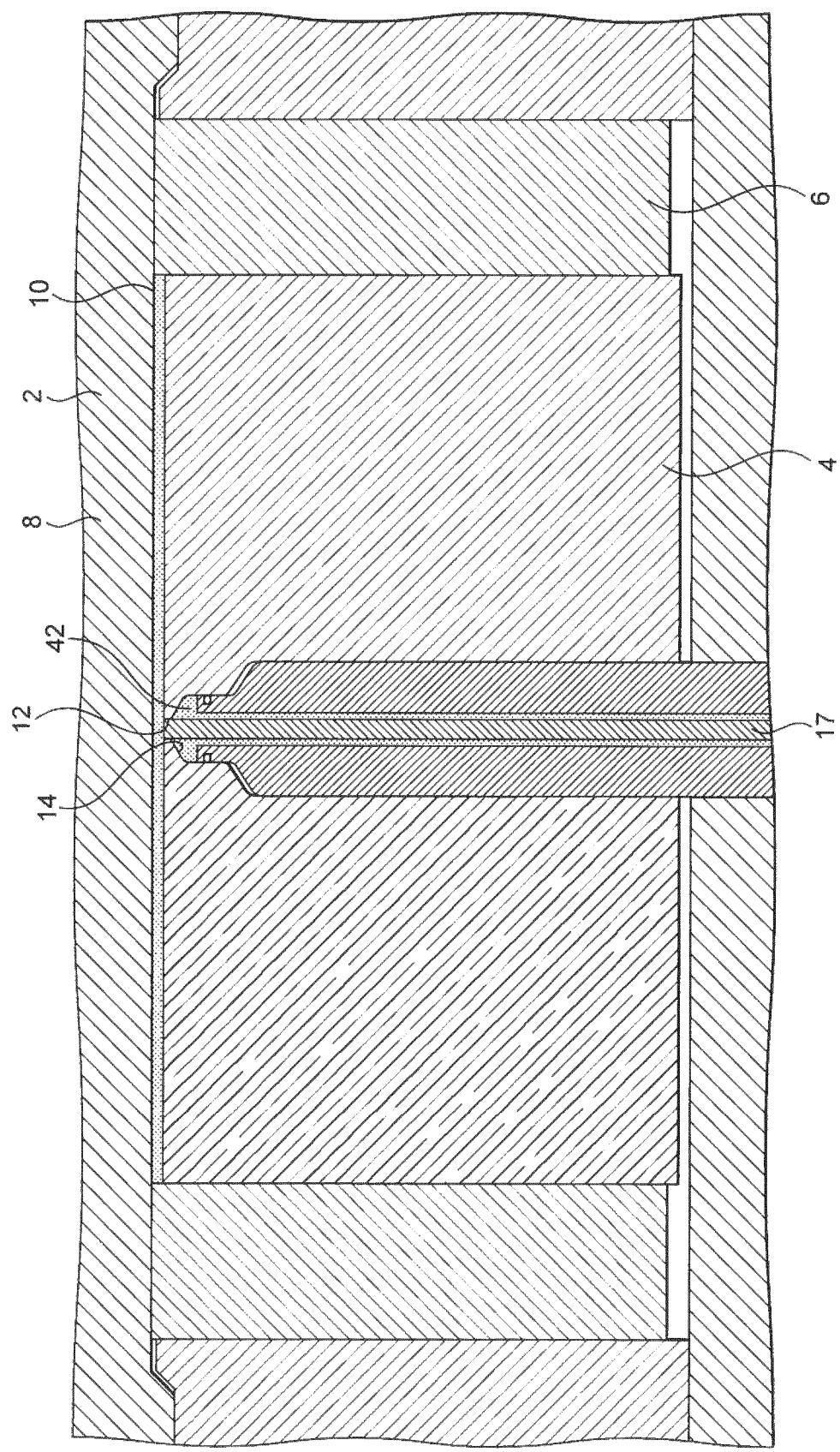
FIG. 3 is a schematic cross-section through the injection mould of FIG. 1 showing the molten material in the first intermediate moulding cavity after closure of the gate of the injection inlet.

After the required weight of thermoplastic resin material 42 has been injected, which weight is limited by the volume in front of the first mould part, the injection inlet 12 is closed, in particular by closing the gate 16 using the valve pin 17, as shown in FIG. 3.

Figure 4:
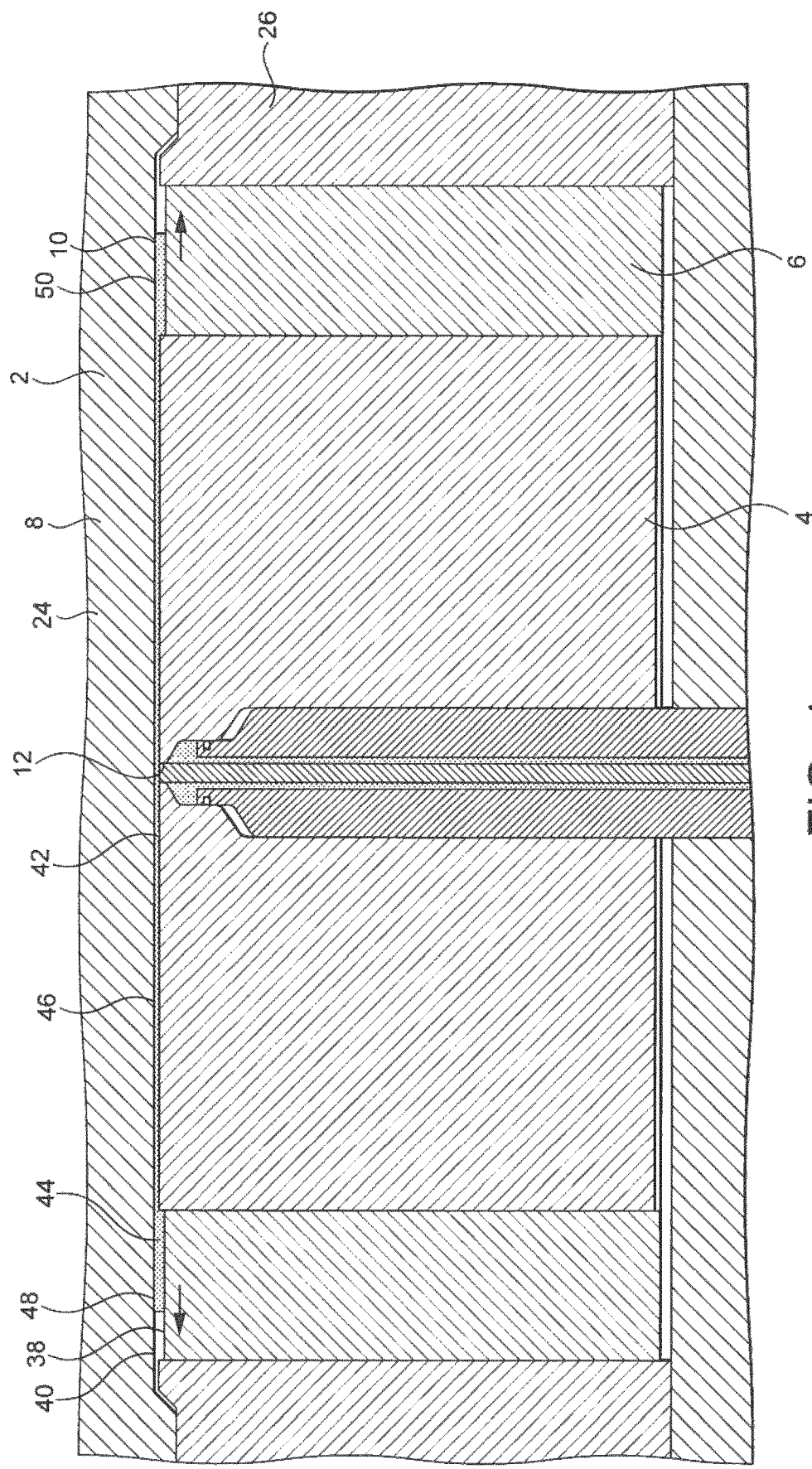
FIG. 4 is a schematic cross-section through the injection mould of FIG. 1 showing a second arrangement of the movable mould parts in a second phase of the method.

Thereafter, referring in particular to FIG. 4, in the illustrate embodiment the first movable mould part 4 is moved forwardly from the first rearward position to a second forward position and the second movable mould part 6 is moved rearwardly from the first forward position to a second rearward position. Such movements dispose the first and second movable mould parts 4, 6 and the further mould parts 24, 26 in a second configuration so as to define a second intermediate moulding cavity 44 filled with the molten material 42.

In the illustrated embodiment, movement of the first and second movable mould parts 4, 6 is commenced after closing the injection inlet 12 and the first and second movable mould parts 4, 6 are moved simultaneously. However, in alternative embodiments, the first and second movable mould parts 4, 6 may be moved only at least partly simultaneously, i.e. one part 4, 6 may move prior to or after movement of the other part 4, 6. In further alternative embodiments, the second movable mould part 6 may be moved initially without any movement of the first mould part 4, which remains stationary, or the movement of the second movable mould part 6 may be commenced and optionally completed before any movement of the first mould part 4. Also, in alternative embodiments, the first and/or second movable mould parts 4, 6 be moved after commencement of the injecting step and at least partly after the closing step, i.e. one or both parts 4, 6 may start movement before the injection inlet 12 has been closed, although there is movement of one or both parts 4, 6 after the injection inlet 12 has been closed.

The second intermediate moulding cavity 44 has a larger moulding volume than the first intermediate moulding cavity 30. The second intermediate moulding cavity 44 has a larger moulding area, when viewed as a plan, than the first intermediate moulding cavity 30. Typically, the second intermediate moulding cavity 44 has a moulding area, when viewed as a plan, which is from 80 to 120%, optionally from 90 to 110%, further optionally from 95 to 105%, larger than the first intermediate moulding cavity 30.

Therefore typically the first and second mould parts 4, 6 have a substantially similar respective area. Typically, the first and second mould parts 4, 6 have respective areas which are within +/−20%, preferably +/−10%, more preferably +/−5% of each other.

The second intermediate moulding cavity 44 comprises a first portion 46 between the first movable mould part 4 and the first further mould part 24 and a second portion 48 between the second movable mould part 6 and the first further mould part 24. In the illustrated embodiment, the second portion 48 annularly surrounds the first portion 46.

The second portion 48 has a larger width than the first portion 46. The second portion 48 typically has a minimum width of at least 0.5 mm, optionally wherein the second portion has a width at any location thereof within the range of from 0.5 to 10 mm, further optionally from 0.5 to 5 mm, still further optionally from 0.7 to 1.2 mm. The first portion 46 typically has a maximum width of no more than 1 mm. The second intermediate moulding cavity 44 has a larger volume than the final moulding cavity.

As the second movable mould part 6 is moved rearwardly, from the first forward position to the second rearward position, the molten material 42 flows over the moulding surface 38 of the second movable mould part 6, and correspondingly also over the opposite moulding surface 40 of the first further mould part 24 which has been exposed by the rearward withdrawal of the second movable mould part 6. As the second movable mould part 6 is moved rearwardly, a portion 50 of the molten material 42 flows outwardly away, in the illustrated embodiment annularly away, from the first movable mould part 4.

Figure 5:
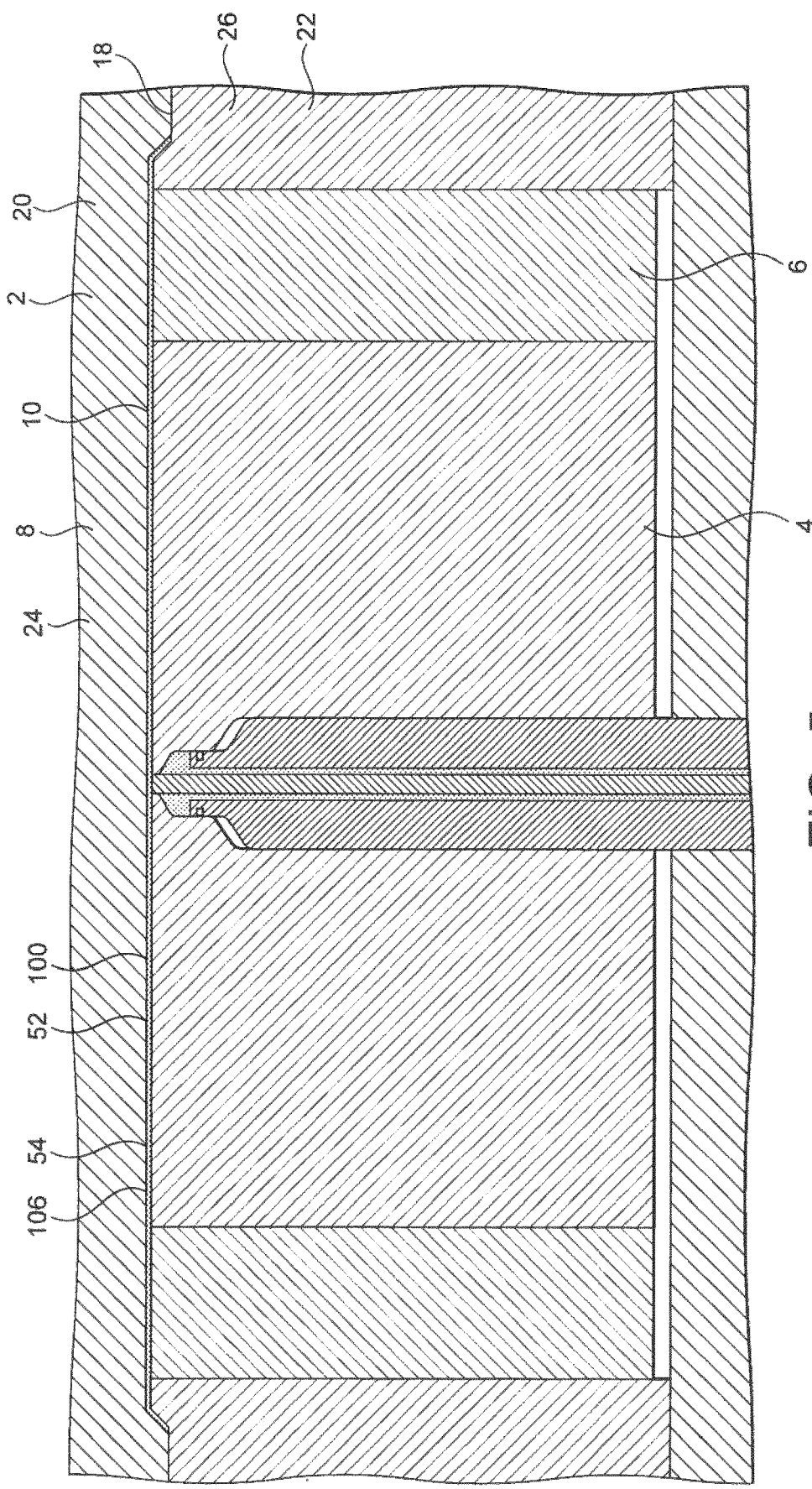
FIG. 5 is a schematic cross-section through the injection mould of FIG. 1 showing a third arrangement of the movable mould parts in a third phase of the method.

Thereafter, referring in particular to FIG. 5, the second movable mould part 6 is moved forwardly from the second rearward position to a third forward position. This movement disposes the first and second movable mould parts 4, 6 and the further mould parts 24, 26 in a third configuration so as to define a final moulding cavity 52 of the injection mould 2 filled with the molten material 42. The final moulding cavity 52 defines a cavity outer surface 54 which defines the outer shape 106 of the preform 100 to be moulded. The first movable mould part 4 is stationary while the second movable mould part 6 is moved forwardly. As the second movable mould part 6 is moved forwardly, the molten material 42 is caused to fill the final moulding cavity 52 and the molten material 42 flows outwardly, in the illustrated embodiment annularly, away from the first movable mould part 4.

At the end of the forward movement of the second movable mould part 6, the molten material 42 is packed under compression, by a clamping force, in the final moulding cavity 52 to define the final preform shape and dimensions. This may be achieved in a holding phase, and shrinkage of the solidified material may be substantially accommodated by the holding phase.

When the first mould part 4 is advanced to its forward limit, the excess material is distributed over the second mould part 6. When the second mould part 6 is advanced to its forward limit, the material cannot flow back over the first mould part 4 because the material over the first mould part 4 has substantially solidified, and therefore the material over the first mould part 4 is shrinking and the pressure is reducing. The clamping force requirement is equal to the area of only one mould part, i.e. the second mould part 6, and not both the first and second mould parts 4, 6. This multi-stage moulding process therefore significantly reduces, and in the embodiment can effectively halve, the clamp force requirement for the preform to accommodate shrinkage of the solidified material.

After the molten material 42 has solidified within the final moulding cavity 52, the injection mould 2 is opened by separating the two mould halves 20, 22 along the mould separation line 18, and the preform 100 is removed from the injection mould 2 for subsequent moulding into a container.

In the illustrated embodiment, the final moulding cavity 52 has a maximum width of no more than 1 mm at any location thereof, optionally within the range of from 0.3 to 1 mm, further optionally from 0.5 to 0.75 mm.

Typically the sequential steps of injecting the resin into the first intermediate mould cavity 30, firstly moving the first and second mould parts 4, 6 to form the second intermediate mould cavity 44, and secondly moving the second mould part 6 to form the final mould cavity 52 are conducted within a period of less than 2 seconds, optionally less than 1 second, further optionally less than 0.5 seconds.

Figure 6:
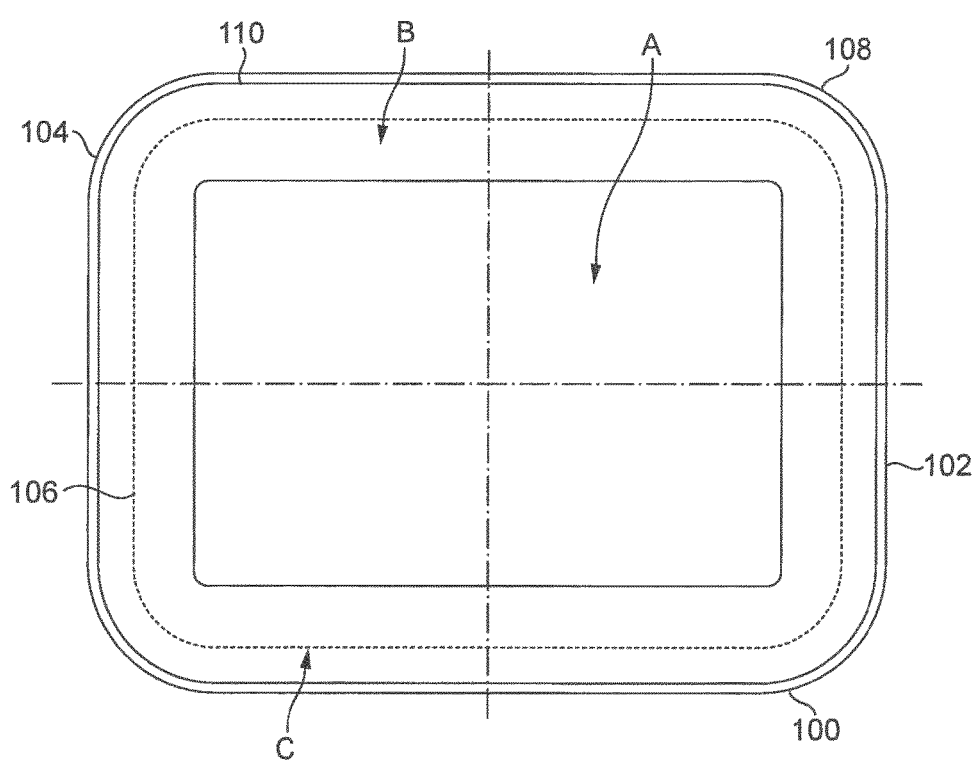
FIGS. 6 and 7 respectively illustrate plan and cross-sectional views of the substantially planar preform produced according to the method using the injection mould of the illustrated embodiment of FIGS. 1 to 5.
Figure 7:
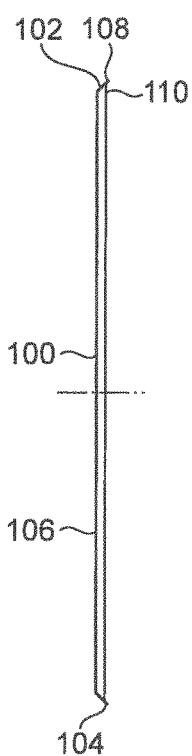

FIGS. 6 and 7 show plan and sectional views of the substantially planar preform 100 according to the illustrated embodiment. The preform 100 typically has a wall thickness T of from 0.3 to 0.75 mm, optionally from 0.4 to 0.6 mm, further optionally about 0.5 mm, over at least a central portion of the preform. The preform 100 has a surface area A of from 500 to 50,000 $mm^2$. The preform 100 has a maximum width W and a wall thickness T, and the ratio of width W:wall thickness T is from 100:1 to 350:1, optionally from 150:1 to 250:1, further optionally about 200:1. The preform 100 has an average bulk width W' and a bulk depth D', and the ratio of average bulk width W':bulk depth D', defining a bulk aspect ratio, is at least 5:1, optionally from 5:1 to 25:1. The preform 100 has a bulk depth D' which is at most 25 mm, optionally from 1 to 25 mm, further optionally from 2 to 20 mm.

The substantially planar preform 100 has an overall general shape and configuration which is planar, although the preform 100 may have some localised three-dimensional shaping. Typically, a peripheral edge 108 of the preform 100 is in the form of a three-dimensionally moulded non-planar flange 110 and is configured to form an upper edge of the resultant container. The flange 110 may be configured to engage a lid, and may be pre-shaped with a lid-engaging or lid-sealing surface structure.

In FIG. 6 the solid rectangular line surrounds an area A moulded by the first mould part 4 and the area B surrounds the area A and is moulded by the second mould part 6. Typically area A and area B differ by no more than +/−5%, preferably by no more than +/−1%. The dotted line C indicates the peripheral edge of the material during moulding when the first and second mould parts 4, 6 are aligned.

The preform 100 produced by the injection moulding method of the present invention may be made into a container by stretch moulding the preform 100, for example by thermoforming, optionally with plug assistance. In a particularly preferred embodiment the preform 100 is substantially planar and the resultant container is in the form of a tray.

The movement of the first and second mould parts 4, 6 may be controlled by one or more pressure actuators (not shown), which may be pneumatically controlled, for example the pneumatic fluid being compressed air, or hydraulically controlled, for example using a hydraulic oil. The pressure actuator(s) can be selectively pressurised to urge the first and second mould parts 4, 6 to their respective forward positions. The forward and rearward positions can be defined by respective mechanical stops or by interlocking of the mould parts. The injection pressure from the injected molten resin material can urge the first movable mould part 4 rearwardly to the rearward position as shown in FIG. 2.

The rearward position can be defined by a mechanical stop. Typically, the pressure applied to the first mould part 4 is sufficient to force the material over the moulding surface of the second mould part 6, for example from 200 to 300 kilograms per square centimeter, and the the squeezing pressure to pack the moulding with the second mould part 6 is also for example from 200 to 300 kilograms per square centimeter.

The method of the preferred embodiments of the present invention provide a method of injection compression moulding in which the moulding cavity receives a precise shot dose of resin material injected into it. With this method the shot dose is controlled by the volume in front of the first mould part. The forward strokes of the first and second mould parts are limited, and therefore do not apply continuous pressure to the material. A pressure is applied before shrinkage of the injected material, and after shrinkage of the injected material there is substantially no pressure applied to the material. The force required to advance the first mould part is only that needed to flow the material across the second mould part. The force required by the second mould part is what is needed to flow the material to the limit of the peripheral edge of the cavity, and subsequently the shrinkage allows the second mould part to reach its forward limit.

The area and stroke of the first mould part create a volume equal to that of the whole moulded article to be produced, thereby creating a pre-determined dose that is adjustable by adjusting the back stroke limit, therefore eliminating the need to use shooting pots or other upstream pre-dosing.

The back positions of the first and second mould parts are adjustable to create preforms with different thicknesses in the range of 100 to 200 microns thicker or thinner than the design thickness of the preform. This can optimize the weight of the resultant container.

The projected area of the first and second mould parts are of a similar area. When the first mould part is advanced to its forward limit, the excess material is distributed over the second mould part. When the second mould part is advanced to its forward limit the material cannot flow back over the first mould part as the material over the first mould part has substantially solidified, therefore the material over the first mould part is shrinking and the pressure is reducing. The clamping force requirement is equal to the area of only one mould part, not both. This effectively halves the clamp force requirement for the preform.

The thermoplastic resin is typically PET. The melt density of PET is approximately 1.2 $gcm^{-3}$, the melt density is affected by the intrinsic viscosity (IV) and melt temperature of the PET. The density of solidified PET (at room temperature, for example 20° C.) is approximately 1.33 $gcm^{-3}$. Accordingly, there is approximately a 10% volume shrinkage of the PET within the mould cavity between the initial injected material and the final solidified material.

In a particularly preferred embodiment, in order to accommodate the shrinkage of the solidified PET material, the volume of injected PET resin in front of the first mould part is adjusted to exactly 110% of that required to fill the final mould cavity to produce the moulded article. In another embodiment, using polypropylene (PP) the volume of injected PP resin would be 120% of that required to fill the final mould cavity to produce the moulded article, the higher % being due to the lower density of PP compared to PET.

In the initial phase of the moulding operation in which the molten resin is injected into the first intermediate moulding cavity 30, the second mould part 6 is disposed forwardly to a first, initial, forward position.

The second mould part 6 is then retracted to form the second intermediate moulding cavity 44, and the first mould part 4 is urged forward as the second mould part 6 is retracted so that resin material flows outwardly into the periphery of the second intermediate moulding cavity 44.

The second mould part 6 then completes the filling of the second intermediate moulding cavity 44 by being moved forwardly to reach an intermediate forward position.

After a subsequent dwell period during which the resin shrinkage is substantially completed, the second mould part 6 is moved forwardly to reach a second, final, forward limit and then there is no further pressure applied to the material by the second mould part 6.

The second mould part 6 has two forward limits: the first, initial, forward limit almost touches the opposite moulding surface to minimize the thickness of the cavity at that location to prevent material flow over the front face of the second mould part 6 and therefore limit the moulding cavity volume to that which is defined in front of the first mould part 4; and a second, final, forward limit which defines the final thickness of the preform.

During a cooling phase after solidification of the molten material, the pressure actuator(s) can be deactivated.

Although various embodiments of the present invention have been described in detail, it will be apparent to those skilled in the art that other modifications of the injection mould and the injection moulding process may be employed that are within the scope of the invention as defined in the appended claims.

The invention claimed is:

1. A method of injection moulding an article, the method comprising the steps of:
    (a) providing an injection mould comprising a plurality of mould parts defining a mould cavity of the injection mould, the plurality of mould parts including first and second movable mould parts, wherein the second movable mould part is annular and wholly surrounds the first movable mould part, and the plurality of mould parts further includes at least one further mould part which is on an opposite side of the injection mould from the first and second movable mould parts, the injection mould further comprising an injection inlet for injecting molten thermoplastic resin material into the mould cavity, wherein the injection inlet is located in the vicinity of the first movable mould part and the second movable mould part is remote from the injection inlet;
    (b) disposing the first and second movable mould parts in a first configuration so as to define a first intermediate moulding cavity, in which first configuration the first movable mould part is in a first rearward position and the second movable mould part is in a first forward position, wherein in the first configuration the first intermediate moulding cavity is defined substantially between the first movable mould part and the at least one further mould part, a moulding surface of the first movable mould part is located spaced from an opposite moulding surface of the at least one further mould part, and a moulding surface of the second movable mould part is located adjacent to the opposite moulding surface of the at least one further mould part;
    (c) injecting molten thermoplastic resin material into the first intermediate moulding cavity through the injection inlet to fill the first intermediate moulding cavity with the molten material;
    (d) closing the injection inlet;
    (e) after commencement of the injecting step and at least partly after the closing step, moving the second movable mould part from the first forward position to a second rearward position;
    (f) moving the first movable mould part from the first rearward position to a second forward position; and
    (g) moving the second movable mould part from the second rearward position to a third forward position thereby to dispose the first and second movable mould parts in a final configuration so as to define a final moulding cavity of the injection mould filled with the molten material, the final moulding cavity defining a cavity outer surface which defines the outer shape of the article to be moulded;
    and wherein the steps of disposing and moving the first and second movable parts to the respective forward and rearward positions with respect to the opposite moulding surface define a width of the respective first intermediate moulding cavity and the final moulding cavity and a corresponding wall thickness of the moulded article.

2. A method according to claim 1 wherein the injection inlet is located in or opposite to the first movable mould part.

3. A method according to claim 1 wherein the first and second movable mould parts are on a common side of the injection mould.

4. A method according to claim 1 wherein the first and second movable mould parts are mutually adjacent.

5. A method according to claim 1 wherein the second movable mould part moulds at least a part, or all, of an outer peripheral portion of the article.

6. A method according to claim 1 wherein the first intermediate moulding cavity has the same volume as the final moulding cavity.

7. A method according to claim 1 wherein in injection step (c) a predosed amount of the molten material is injected into the first intermediate moulding cavity and wherein wherein in injection step (c) the predosed amount of the molten material is within +/−1 wt % of a target weight of the molten material to be injected into the first intermediate moulding cavity.

8. A method according to claim 1 wherein the first intermediate moulding cavity has a minimum width of at least 1 mm, or wherein the first intermediate moulding cavity has a width at any location thereof within the range of from 0.5 to 10 mm, or from 1 to 5 mm, or from 0.7 to 1.2 mm.

9. A method according to claim 1 wherein step (e) of moving the second movable mould part is commenced after closing the injection inlet in step (d).

10. A method according to claim 1 wherein in steps (e) and (f) the first movable mould part and the second movable mould part are moved at least partly simultaneously, or simultaneously.

11. A method according to claim 1 wherein step (e) to move the second movable mould part is commenced, or commenced and completed, before step (f) to move the first movable mould part.

12. A method according to claim 1 wherein step (f) to move the first movable mould part is carried out at least partly simultaneously, or simultaneously, with step (g) to move the second movable mould part.

13. A method according to claim 1 wherein in step (g) the first movable mould part is stationary.

14. A method according to claim 1 wherein after step (e), or after steps (e) and (f), the first and second movable mould parts and the at least one further mould part are disposed in a second configuration so as to define a second intermediate moulding cavity at least partly filled with the moulding material.

15. A method according to claim 14 wherein the second intermediate moulding cavity has a larger moulding volume than the first intermediate moulding cavity.

16. A method according to claim 14 wherein the second intermediate moulding cavity has a larger moulding area, when viewed as a plan, than the first intermediate moulding cavity, or wherein the second intermediate moulding cavity has a moulding area, when viewed as a plan, which is from 80 to 120%, or from 90 to 110%, or from 95 to 105%, larger than the first intermediate moulding cavity.

17. A method according to claim 14 wherein the second intermediate moulding cavity comprises a first portion between the first movable mould part and at least one further mould part and a second portion between the second movable mould part and the at least one further mould part, and the second portion has a larger width than the first portion.

18. A method according to claim 17 wherein the second portion annularly surrounds the first portion.

19. A method according to claim 17 wherein the second portion has a minimum width of at least 0.5 mm, or wherein the second portion has a width at any location thereof within the range of from 0.5 to 10 mm, or from 1 to 5 mm, or from 0.7 to 1.2 mm.

20. A method according to claim 17 wherein the first portion has a maximum width of no more than 1 mm, or from 0.3 to 1 mm.

21. A method according to claim 14 wherein the second intermediate moulding cavity has a larger volume than the final moulding cavity.

22. A method according to claim 1 wherein in step (e) as the second movable mould part is moved from the first forward position to the second rearward position the molten material flows over a moulding surface of the second movable mould part.

23. A method according to claim 1 wherein in step (e) as the second movable mould part is moved from the first forward position to the second rearward position a portion of the molten material flows outwardly or annularly away from the first movable mould part.

24. A method according to claim 1 wherein in step (g) as the second movable mould part is moved from the second rearward position to the third forward position the molten material is caused to fill the final moulding cavity and/or flows outwardly or annularly away from the first movable mould part.

25. A method according to claim 1 wherein the final moulding cavity has a maximum width of no more than 1 mm at any location thereof, or within the range of from 0.3 to 1 mm, or from 0.5 to 0.75 mm.

26. A method according to claim 1 wherein steps (c) to (g) are conducted within a period of less than 2 seconds, or less than 1 second.

27. A method according to claim 1 wherein the step of moving the second movable mould part to the final configuration defines the outer shape of the article to be a substantially planar preform for forming a container or a substantially planar lid for a container, and the article has one or more of: (i) a wall thickness T of from 0.3 to 0.75 mm over at least a central portion of the article; (ii) a surface area A of from 500 to 50,000 $mm^2$; (iii) a maximum width W and a wall thickness T, and the ratio of width W:wall thickness T is from 100:1 to 350:1; (iv) an average bulk width W' and a bulk depth D', and the ratio of average bulk width W':bulk depth D', defining a bulk aspect ratio, is from 5:1 to 25:1; (v) a bulk depth D' which is from 1 to 25 mm; (vi) an overall general shape and configuration which is planar and the article has some localised three-dimensional shaping; (vii) a peripheral edge of the substantially planar preform which is in the form of a three-dimensionally moulded non-planar flange and is configured to form an upper edge of the container, the flange being pre-shaped with a lid-engaging or lid-sealing surface structure.

28. A method according to claim 1 wherein the thermoplastic resin material comprises at least one polyester selected from polyethylene terephthalate, polybutylene terephthalate, polyethylene naphthalate and polybutylene naphthalate.

29. A method according to claim 1 wherein after steps (e) and (f), the first and second movable mould parts and the at least one further mould part are disposed in a second configuration so as to define a second intermediate moulding cavity at least partly filled with the moulding material, and wherein the first intermediate moulding cavity moulds a first intermediate article having a first L/T ratio, the second intermediate moulding cavity moulds a second intermediate article having a second L/T ratio and the final moulding cavity moulds a final article having a third L/T ratio, wherein each L/T ratio is a ratio, averaged along a maximum length of the respective article, of the maximum length of the article and a thickness of the article along that maximum length, and wherein the first L/T ratio is lower than the second L/T ratio and the second L/T ratio is lower than the third L/T ratio.

30. A method of injection moulding an article, the method comprising the steps of:
(a) providing an injection mould comprising a plurality of movable mould parts and at least one stationary mould part defining a mould cavity of the injection mould, the injection mould further comprising an injection inlet for injecting molten thermoplastic resin material into the mould cavity;
(b) disposing the mould parts in a first configuration so as to define a first intermediate moulding cavity;
(c) injecting molten thermoplastic resin material into the first intermediate moulding cavity through the injection inlet to fill the first intermediate moulding cavity with the molten material to form a first intermediate article comprising molten material;
(d) closing the injection inlet;
(e) after the closing step, moving at least one of the movable mould parts to dispose the mould parts in a second configuration so as to define a second intermediate moulding cavity at least partly filled with the molten material to form a second intermediate article comprising molten material; and
(f) moving the at least one of the movable mould parts to dispose the mould parts in a third configuration so as to define a final moulding cavity of the injection mould filled with the molten material, the final moulding cavity defining a cavity outer surface which defines the outer shape of the final article to be moulded, and wherein the first intermediate moulding cavity has the same volume as the final moulding cavity;
wherein the first intermediate article has a first length to thickness L/T ratio, the second intermediate article has a second L/T ratio and the final article has a third L/T ratio, wherein each L/T ratio is a ratio, averaged along a maximum length of the respective article, of the maximum length of the article and a thickness of the article along that maximum length, and wherein the first L/T ratio is lower than the second L/T ratio and the second L/T ratio is lower than the third L/T ratio.

31. A method of injection moulding an article, the method comprising the steps of:
(a) providing an injection mould comprising a plurality of mould parts defining a mould cavity of the injection mould, the plurality of mould parts including first and second movable mould parts, and the plurality of mould parts further includes a further mould part which is on an opposite side of the injection mould from the first and second movable mould parts, the injection mould further comprising an injection inlet for injecting molten thermoplastic resin material into the mould cavity, wherein the injection inlet is located in the vicinity of the first movable mould part and the second movable mould part is remote from the injection inlet;
(b) disposing the first and second movable mould parts in a first configuration so as to define a first intermediate moulding cavity, in which first configuration the first movable mould part is in a first rearward position and the second movable mould part is in a first forward position, wherein the first intermediate moulding cavity is defined substantially between the first movable mould part and the further mould part opposite thereto, a peripheral edge of the first intermediate moulding cavity is defined by a side surface, which is a non-moulding surface, of the second movable mould part, a moulding surface of the first movable mould part is located spaced from an opposite moulding surface of the first further mould part, and a moulding surface of the second movable mould part is located adjacent to an opposite moulding surface of the further mould part, and no portion of the first intermediate moulding cavity is defined between the second movable mould part and the further mould part;
(c) injecting a volume of molten thermoplastic resin material into the first intermediate moulding cavity through the injection inlet to fill the first intermediate moulding cavity with the molten material;
(d) closing the injection inlet;
(e) after the closing step, moving the first and second movable mould parts thereby to dispose the first and second movable mould parts in a final configuration so as to define a final moulding cavity of the injection mould filled with the molten material, the final moulding cavity defining a cavity outer surface which defines the outer shape of the article to be moulded and the final moulding cavity have the same volume as the first intermediate moulding cavity;
and wherein the steps of disposing and moving the first and second movable mould parts to the respective forward and rearward positions with respect to the opposite moulding surface define a width of the first intermediate moulding cavity and the final moulding cavity and a corresponding wall thickness of the moulded article.

* * * * *